(12) United States Patent
Tueno et al.

(10) Patent No.: US 10,360,390 B2
(45) Date of Patent: Jul. 23, 2019

(54) OBLIVIOUS ORDER-PRESERVING ENCRYPTION

(71) Applicant: SAP SE, Walldorf (DE)

(72) Inventors: Anselme Kemgne Tueno, Erlenbach (DE); Florian Kerschbaum, Frankfurt (DE)

(73) Assignee: SAP SE, Walldorf (DE)

( * ) Notice: Subject to any disclaimer, the term of this patent is extended or adjusted under 35 U.S.C. 154(b) by 167 days.

(21) Appl. No.: 15/379,034

(22) Filed: Dec. 14, 2016

(65) Prior Publication Data

US 2018/0165460 A1    Jun. 14, 2018

(51) Int. Cl.
*G06F 21/60* (2013.01)
*H04L 9/06* (2006.01)
*G06F 16/245* (2019.01)

(52) U.S. Cl.
CPC ............ *G06F 21/602* (2013.01); *H04L 9/06* (2013.01); *G06F 16/245* (2019.01); *H04L 2209/50* (2013.01)

(58) Field of Classification Search
None
See application file for complete search history.

(56) References Cited

U.S. PATENT DOCUMENTS

| | | | | |
|---|---|---|---|---|
| 7,689,547 | B2* | 3/2010 | Cristofor | G06F 17/30312 380/28 |
| 8,291,509 | B2* | 10/2012 | Kerschbaum | G06F 21/6245 726/30 |
| 9,037,860 | B1* | 5/2015 | Kerschbaum | H04L 63/0428 713/168 |
| 9,613,055 | B2* | 4/2017 | Tyercha | G06F 17/30241 |
| 9,626,524 | B2* | 4/2017 | Puri | H04L 63/0407 |
| 9,800,558 | B2* | 10/2017 | Kerschbaum | H04L 9/00 |
| 9,971,904 | B2* | 5/2018 | Fan | G06F 21/6218 |
| 2008/0019510 | A1* | 1/2008 | Kerschbaum | H04L 9/008 380/30 |

(Continued)

OTHER PUBLICATIONS

Reddy_2 (Reddy et al. "A New Randomized Order Preserving Encryption Scheme", International Journal of Computer Applications (0975-8887) vol. 108-No. 12, Dec. 2014).*

(Continued)

*Primary Examiner* — Piotr Poltorak
(74) *Attorney, Agent, or Firm* — Mintz Levin Cohn Ferris Glovsky and Popeo, P.C.

(57) ABSTRACT

Methods, systems, and articles of manufacture are provided for oblivious order preserving encryption. A method may include: traversing, by a cloud service provider, an order preserving encryption (OPE) tree based on a result of an oblivious comparison performed by a data owner and a data client, the OPE tree having nodes that each correspond to a ciphertext of data associated with the data owner, the ciphertext of the data being stored at the cloud service provider, and a relative position of the nodes within the OPE tree corresponding to an order that is present in the data associated with the data owner; and determining, based on the traversing of the OPE tree, an OPE encoding for an input value from the data client, the OPE encoding for the input value indicative of a position of a node corresponding to the input value within the OPE tree.

20 Claims, 11 Drawing Sheets

(56) References Cited

U.S. PATENT DOCUMENTS

| | | | | |
|---|---|---|---|---|
| 2008/0133935 | A1* | 6/2008 | Elovici | G06F 21/6227 |
| | | | | 713/193 |
| 2011/0252310 | A1* | 10/2011 | Rahaman | G06F 17/2211 |
| | | | | 715/255 |
| 2012/0121080 | A1* | 5/2012 | Kerschbaum | H04L 9/085 |
| | | | | 380/28 |
| 2013/0179495 | A1* | 7/2013 | Eom | G06F 9/5072 |
| | | | | 709/203 |
| 2016/0063037 | A1* | 3/2016 | Savkli | G06F 16/532 |
| | | | | 707/722 |
| 2016/0350518 | A1* | 12/2016 | Mo | G06F 21/10 |
| 2017/0039386 | A1* | 2/2017 | Lehnhardt | G06F 21/6227 |
| 2017/0124335 | A1* | 5/2017 | Freudiger | G06F 21/6254 |
| 2017/0300703 | A1* | 10/2017 | Deshpande | G06F 21/6218 |
| 2017/0300713 | A1* | 10/2017 | Fan | H04L 9/0618 |
| 2018/0019866 | A1* | 1/2018 | Kerschbaum | H04L 9/002 |
| 2018/0083960 | A1* | 3/2018 | Sbeiti | H04L 9/3236 |

OTHER PUBLICATIONS

Roche et al., "POPE Partial Order Preserving Encoding", CCS '16 Proceedings of the 2016 ACM SIGSAC Conference on Computer and Communications Security, p. 1131-1142, Oct. 24-28, 2016.*
Reddy (Reddy et al. "A novel Dunamic Order-Preserving Encryption Scheme", 2014 First International Conference on Networks & Soft Computing (ICNSC2014), Sep. 2014).*
Popa et al., "An Ideal-Security Protocol for Order-Preserving Encoding", 1081-6011/13 IEEE DOI 10.1109.SP.2013.38, 2013.*
Agrawal, Rakesh, et al. "Order preserving encryption for numeric data." Proceedings of the 2004 ACM SIGMOD international conference on Management of data. ACM, (12 pages), 2004.
Atallah, Mikhail J., et al. "Secure supply-chain protocols." E-Commerce, 2003. CEC 2003. IEEE International Conference on. IEEE, (11 pages), 2003.
Atallah, Mikhail, et al. "Private collaborative forecasting and benchmarking." Proceedings of the 2004 ACM workshop on Privacy in the electronic society. ACM, (13 pages), 2004.
Ben-Or, Michael, Shafi Goldwasser, and Avi Wigderson. "Completeness theorems for non-cryptographic fault-tolerant distributed computation." Proceedings of the twentieth annual ACM symposium on Theory of computing. ACM, (9 pages), 1988.
Bogdanov, Dan, Riivo Talviste, and Jan Willemson. "Deploying secure multi-party computation for financial data analysis." International Conference on Financial Cryptography and Data Security. Springer Berlin Heidelberg, (15 pages), 2012.
Bogdanov, Dan, Sven Laur, and Jan Willemson. "Sharemind: A framework for fast privacy-preserving computations." European Symposium on Research in Computer Security. Springer Berlin Heidelberg, (23 pages), 2008.
Bogetoft, Peter, et al. "Secure multiparty computation goes live." Cryptology EPrint Archive, Report 2008/068, (19 pages), 2008.
Boldyreva, Alexandra, et al. "Order-preserving symmetric encryption." Annual International Conference on the Theory and Applications of Cryptographic Techniques. Springer Berlin Heidelberg, (24 pages), 2009.
Boldyreva, Alexandra, Nathan Chenette, and Adam O'Neill. "Order-preserving encryption revisited: Improved security analysis and alternative solutions." Annual Cryptology Conference. Springer Berlin Heidelberg, (43 pages), 2011.
Catrina, Octavian, and Florian Kerschbaum. "Fostering the uptake of secure multiparty computation in e-commerce." Availability, Reliability and Security, 2008. ARES 08. Third International Conference on. IEEE, (8 pages), 2008.
Chaum, David, Claude Crépeau, and Ivan Damgard. "Multiparty unconditionally secure protocols." Proceedings of the twentieth annual ACM symposium on Theory of computing. ACM, pp. 11-19, 1988.
Du, Wenliang, and Mikhail J. Atallah. "Privacy-Preserving Cooperative Scientific Computations." csfw. vol. 1. (11 pages), 2001.

Ducas, Léo, and Daniele Micciancio. "FHEW: Bootstrapping homomorphic encryption in less than a second." Annual International Conference on the Theory and Applications of Cryptographic Techniques. Springer Berlin Heidelberg, (18 pages), 2015.
Ejgenberg, Yael, et al. "SCAPI: The Secure Computation Application Programming Interface." IACR Cryptology EPrint Archive 2012 (17 pages), Nov. 14, 2013.
Yao, Andrew C. "Protocols for secure computations." Foundations of Computer Science, 1982. SFCS'08. 23rd Annual Symposium on. IEEE, (5 pages), 1982.
Gentry, Craig. "Fully homomorphic encryption using ideal lattices." STOC. vol. 9. No. 2009. pp. 169-178, 2009.
Goldreich, Oded, Silvio Micali, and Avi Wigderson. "How to play any mental game." Proceedings of the nineteenth annual ACM symposium on Theory of computing. ACM, pp. 218-229, 1987.
Goldreich, Oded. Foundations of cryptography: vol. 2, basic applications. Cambridge university press, (450 pages), 2009.
Huang, Yan, et al. "Faster Secure Two-Party Computation Using Garbled Circuits." USENIX Security Symposium. vol. 201. No. 1 (16 pages), 2011.
Kerschbaum, Florian, and Axel Schröpfer. "Optimal average-complexity ideal-security order-preserving encryption." Proceedings of the 2014 ACM SIGSAC Conference on Computer and Communications Security. ACM, (12 pages), 2014.
Kerschbaum, Florian. "Frequency-hiding order-preserving encryption." Proceedings of the 22nd ACM SIGSAC Conference on Computer and Communications Security. ACM, (12 pages), 2015.
Kerschbaum, Florian. "Privacy-preserving computation." Annual Privacy Forum. Springer Berlin Heidelberg, (14 pages), 2012.
Kolesnikov, Vladimir, Ahmad-Reza Sadeghi, and Thomas Schneider. "Improved garbled circuit building blocks and applications to auctions and computing minima." International Conference on Cryptology and Network Security. Springer Berlin Heidelberg, (16 pages), 2009.
Kolesnikov, Vladimir, and Thomas Schneider. "Improved garbled circuit: Free XOR gates and applications." International Colloquium on Automata, Languages, and Programming. Springer Berlin Heidelberg, (pp. 13), 2008.
Lindell, Yehuda, and Ben Riva. "Cut-and-choose Yao-based secure computation in the online/offline and batch settings." International Cryptology Conference. Springer Berlin Heidelberg, (55 pages), 2014.
Lindell, Yehuda, and Benny Pinkas. "A proof of security of Yao's protocol for two-party computation." Journal of Cryptology 22.2 (2009): 161-188.
Lindell, Yehuda, and Benny Pinkas. "An efficient protocol for secure two-party computation in the presence of malicious adversaries." Annual International Conference on the Theory and Applications of Cryptographic Techniques. Springer Berlin Heidelberg, (36 pages), 2007.
Lindell, Yehuda, and Benny Pinkas. "Privacy preserving data mining." Annual International Cryptology Conference. Springer Berlin Heidelberg, (19 pages), 2000.
Lindell, Yehuda, and Benny Pinkas. "Secure multiparty computation for privacy-preserving data mining." Journal of Privacy and Confidentiality 1.1, pp. 59-98, (2009).
Lindell, Yehuda. "Fast cut-and-choose-based protocols for malicious and covert adversaries." Journal of Cryptology 29.2 (2016): 456-490.
Mavroforakis, Charalampos, et al. "Modular order-preserving encryption, revisited." Proceedings of the 2015 ACM SIGMOD International Conference on Management of Data. ACM, (15 pages), 2015.
Kristin Lauter, Naehrig, Michael, and Vinod Vaikuntanathan. "Can homomorphic encryption be practical?." Proceedings of the 3rd ACM workshop on Cloud computing security workshop. ACM, (18 pages), 2011.
Naveed, Muhammad, Seny Kamara, and Charles V. Wright. "Inference attacks on property-preserving encrypted databases." Proceedings of the 22nd ACM SIGSAC Conference on Computer and Communications Security. ACM, (13 pages), 2015.
Orlandi, Claudio. "Is multiparty computation any good in practice?." Acoustics, Speech and Signal Processing (ICASSP), 2011 IEEE International Conference on. IEEE, pp. 5849-5851, 2011.

(56) References Cited

OTHER PUBLICATIONS

Paillier, Pascal. "Public-key cryptosystems based on composite degree residuosity classes." International Conference on the Theory and Applications of Cryptographic Techniques. Springer Berlin Heidelberg, pp. 223-238, 1999.

Pedersen, Torben Pryds. "Non-interactive and information-theoretic secure verifiable secret sharing." Annual International Cryptology Conference. Springer Berlin Heidelberg, pp. 129-140, 1991.

Pinkas, Benny, et al. "Secure two-party computation is practical." International Conference on the Theory and Application of Cryptology and Information Security. Springer Berlin Heidelberg, (20 pages), 2009.

Popa, Raluca Ada, et al. "CryptDB: protecting confidentiality with encrypted query processing." Proceedings of the Twenty-Third ACM Symposium on Operating Systems Principles. ACM, (16 pages), 2011.

Popa, Raluca Ada, Frank H. Li, and Nickolai Zeldovich. "An ideal-security protocol for order-preserving encoding." Security and Privacy (SP), 2013 IEEE Symposium on. IEEE, pp. 463-477, 2013.

Van Dijk, Marten, et al. "Fully homomorphic encryption over the integers." Annual International Conference on the Theory and Applications of Cryptographic Techniques. Springer Berlin Heidelberg, (28 pages), 2010.

Damgard, Ivan, et al., "A Generalisation a Simplification and some Applications of Paillier's Probabilistic Public-Key System," Basic Research in Computer Science Report Series, (21 pages), Dec. 2000.

\* cited by examiner

| [x] | y |
|---|---|
| [10] | 4 |
| [20] | 7 |
| [25] | 11 |
| [32] | 14 |
| [69] | 21 |

| (x,y) |
|---|
| (32,14) |
| (20,7) |
| (25,11) |
| (69,21) |
| (10,4) |

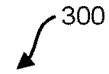

---

Protocol 1 Oblivious OPE Protocol

---

Input ($In_{CSP}$, $In_{DA}$, $In_{DO}$): (S, $\bar{x}$, sk)
Output ($Out_{CSP}$, $Out_{DA}$, $Out_{DO}$): ($<[\bar{x}], \bar{y}>, \bar{y}, \emptyset$)
Functionality : OOPE(S, $\bar{x}$, sk)

---

1: CSP : retrieve root [$x_{root}$] of T
2: CSP : let [x] ← [$x_{root}$]
3: repeat
4:     ( $<b_e, b_g>, \emptyset, \emptyset$ ) ← Compare([x], $\bar{x}$, sk )
5:     CSP : let Stop ← false
6:     CSP : if $b_e$ = 0 then    ▷ meaning $\bar{x}$ = x
7:     CSP :     retrieve <[x], y> and let $\bar{y}$ ← y
8:     CSP :    let Stop ← true
9:     CSP : else
10:    CSP :    [$x_{next}$] ← Traverse($b_g$, [x])
11:    CSP :    if [$x_{next}$] = NIL then
12:    CSP :        $\bar{y}$ ← Encrypt($b_g$, [x])
13:    CSP :        let Stop ← true
14:    CSP :    else
15:    CSP :        let [x] ← [$x_{next}$]
16:    CSP :    end if
17:    CSP :  end if
18: until Stop = true
19: CSP → DA: send $\bar{y}$
20: DA → CSP: send [$\bar{x}$]

Protocol 2 Oblivious Comparison Protocol

Input ( $In_{CSP}$, $In_{DA}$, $In_{DO}$ ): ( $[x]$, $\bar{x}$, sk )
Output ( $Out_{CSP}$, $Out_{DA}$, $Out_{DO}$ ): ( $<b_e, b_g>$, $\emptyset, \emptyset$)
Functionality : Compare($[x]$, $\bar{x}$, sk )

---

1: CSP: choose a random $r \in P - \{0\}$ and computes $[x + r]$
2: CSP $\to$ DO: send $[x + r]$
3: CSP $\to$ DA: send r
4: DO: decrypt $[x + r]$ and choose masking bits $b_o$, $b'_o$
5: DA: compute $\bar{x} + r$ and choose masking bits $b_a$, $b'_a$
6: DO $\to$ GC : send $(b_o, b'_o, x + r)$
7: DA $\to$ GC : send $(b_a, b'_a, \bar{x} + r)$
8: GC $\leftrightarrow$ DA: send $(b_e \oplus b_a \oplus b_o, b_g \oplus b'_a \oplus b'_o)$
9: GC $\leftrightarrow$ DO: send $(b_e \oplus b_a \oplus b_o, b_g \oplus b'_a \oplus b'_o)$
10: DA $\leftrightarrow$ CSP: send $(b_a, b'_a, b_e \oplus b_o, b_g \oplus b'_o)$
11: DO $\leftrightarrow$ CSP: send $(b_0, b'_o, b_e \oplus b_a, b_g \oplus b'_a)$
12: CSP : compute $b_e = b_e \oplus b_o \oplus b_o = b_e \oplus b_a \oplus b_a$
13: CSP: compute $b_g = b_g \oplus b_o \oplus b_o = b_g \oplus b_a \oplus b_a$
14: CSP : output $< b_e, b_g >$

FIG. 3B

| Algorithm 3 Tree Traversal |
|---|
| Input: $b_g$, [x] <br> Output: $[x_{next}]$ |
| 1: function Traverse($b_g$, [x] ) <br> 2:    if $b_g$ = 0 then        ▷ traverse to left <br> 3:        Let $[x_{next}]$ be the left child node of [x] <br> 4:    else        ▷ traverse to right <br> 5:        Let $[x_{next}]$ be the right child node of [x] <br> 6:    end if <br> 7:    return $[x_{next}]$ <br> 8: end function |

---
Algorithm 4 Encryption for value $\bar{x}$
---

1: function Encrypt ($b_g$, [x] )
2:     retrieve <[x] , y> in the OPE-table
3:     if $b_g$ = 0 then
4:         retrieve predecessor < [x'], y'> of <[x] , y>
5:         let $y_l \leftarrow$ y' and $y_r \leftarrow$ y         ▷ y'< y
6:     else
7:         retrieve successor < [x"], y"> of < [x],y>
8:         let $y_l \leftarrow$ y and $y_r \leftarrow$ y"         ▷ y < y"
9:     end if
10:    if $y_r - y_l$ = 1 then
11:        rebalance the OPE-tree
12:    end if
13:    $\bar{y} \leftarrow y_l + \lceil \frac{y_r - y_l}{2} \rceil$
14:    return $\bar{y}$
15: end function

FIG. 3D

---

Protocol 5 Min Max Order Protocol

---

Input ( $In_{CSP}$, $In_{DA}$, $In_{DO}$ ): ( $<S, [\overline{x}], \overline{y}>>$ , $\emptyset$ , sk)
Output ( $O_{CSP}$, $O_{DA}$, $O_{DO}$ ): ($\emptyset$, $<C_{min}(\overline{x}), C_{max}(\overline{x})>$ , $\emptyset$)
Functionality : MinMaxOrder(S, $<[\overline{x}], \overline{y} >$, sk)

---

1: CSP: retrieve $< [x_i], y_i >$ , $< [x_{i+1}], y_{i+1} >$ s.t. $y_i < \overline{y} < y_{i+1}$
2: CSP: choose random integers $s_1$ , $s_2$ , $r_1$ , $r_2$
3: CSP: compute $[d_1] \leftarrow [(x_i - \overline{x}) \cdot s_1]$
4: CSP: compute $[d_2] \leftarrow [(x_{i+1} - \overline{x}) \cdot s_2]$
5: CSP $\to$ DO: send $<[d_1], [\overline{y} \cdot r_1]_{DA}, [C_{min}(x_i) \cdot r_1]>$
6: CSP $\to$ DO: send $<[d_2], [\overline{y} \cdot r_2]_{DA}, [C_{max}(x_i) \cdot r_2]>$
7: CSP $\to$ DA: send $r_1$ and $r_2$
8: DO: decrypt $[d_1], [d_2]$ and evaluate Equation 14
9: DO $\to$ DA: send $[c_{min}(\overline{x}) \cdot r_1]_{DA}$
10: DO $\to$ DA: send $[c_{max}(\overline{x}) \cdot r_2]_{DA}$
11: DA: decrypt and output $c_{min}(\overline{x})$ and $c_{max}(\overline{x})$

OBLIVIOUS ORDER-PRESERVING ENCRYPTION

STATEMENT OF GOVERNMENT SPONSORED SUPPORT

The project leading to this application has received funding from the European Union's Horizon 2020 Research and Innovation Programme under Grant Agreement No. 644579.

TECHNICAL FIELD

The subject matter described herein relates generally to database processing and more specifically to multiparty computations on outsourced data.

BACKGROUND

Cloud computing refers to a practice in which a data owner uses remote storage and/or computing resources (e.g., data as a service (DaaS), storage as a service (STaaS)) to store, manage, and process data instead of local storage and/or computing resources. Outsourcing the storage, management, and/or processing of data in this manner may provide a convenient and cost effective solution for limited local storage and/or computing resources. But by storing data to a remote database, a data owner is also relinquishing control over the data to an untrusted cloud service provider and risking exposure of sensitive data to possible misuse. For instance, outsourced data is typically stored in a multi-tenant remote database and may thus comingle with data belonging to other data owners.

To prevent unauthorized access to data stored at the remote database, a data owner may choose to encrypt outsourced data beforehand. However, encrypting data can hinder legitimate attempts to operate on the data because encryption generally obliterates the order that is present in the data. Thus, common database operations that rely on order comparisons (e.g., range queries, sorting, ranking, and/or the like) cannot be performed on the ciphertext of the data. Accordingly, a data owner may be required to decrypt the data before the data owner is able to perform any order-based operation on the data.

SUMMARY

In one aspect, there is provided a method. The method may include: traversing, by a cloud service provider, an order preserving encryption (OPE) tree based at least on a result of an oblivious comparison performed by a data owner and a data client, the OPE tree having a plurality of nodes that each correspond to a ciphertext of data associated with the data owner, the ciphertext of the data associated with the data owner being stored at the cloud service provider, and a relative position of the plurality of nodes within the OPE tree corresponding to an order that is present in the data associated with the data owner; and determining, based at least on the traversing of the OPE tree, an OPE encoding for an input value from the data client, the OPE encoding for the input value indicative of a position of a node corresponding to the input value within the OPE tree.

In some variations, one or more features disclosed herein including the following features can optionally be included in any feasible combination. The traversing of the OPE tree may include: selecting a node from the OPE tree; providing, to the data owner, a randomized input corresponding to a ciphertext at the node selected from the OPE tree; and providing, to the data client, a randomized input corresponding to the input value from the data client. The OPE encoding for the input value from the data client may be determined to be an OPE encoding associated with the node, when the result of the oblivious comparison indicates that the input value from the data client is equal to a plaintext value of the ciphertext at the node selected from the OPE tree. The cloud service provider may determine whether the node has one or more child nodes, when the result of the oblivious comparison indicates that the input value from the data client is not equal to a plaintext value of the ciphertext at the node selected from the OPE tree. The cloud service provider may generate, based at least on an OPE encoding associated with the node, the OPE encoding for the input value, when the cloud service provider determines that the node does not have one or more child nodes. The OPE encoding for the input value may be further determined based on an OPE encoding of a successor node or a predecessor node of the node.

In some variations, the performing of the oblivious comparison may include: generating, by the data owner, a garbled circuit configured to perform the oblivious comparison; and evaluating, by the data client, the garbled circuit, the evaluating of the garbled circuit being based at least on the randomized input corresponding to the input value from the data client. The garbled circuit may be configured to mask the result of the oblivious comparison using one or more masking bits associated with the data owner and/or the data client. The performing of the oblivious comparison may further include: partially unmasking, by the data owner, the result of the oblivious comparison using one or more masking bits associated with the data owner; partially unmasking, by the data client, the result of the oblivious comparison using one or more masking bits associated with the data client; and receiving, at the cloud service provider, a partially unmasked result of the oblivious comparison from each of the data owner and the data client and a respective masking bits used by each of the data owner and the data client.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to web application user interfaces, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 3A depicts pseudo program code consistent with implementations of the current subject matter;

FIG. 3B depicts pseudo program code consistent with implementations of the current subject matter;

FIG. 3D depicts pseudo program code consistent with implementations of the current subject matter;

FIG. 3E depicts pseudo program code consistent with implementations of the current subject matter;

When practical, similar reference numbers denote similar structures, features, or elements.

DETAILED DESCRIPTION

Figure 1:
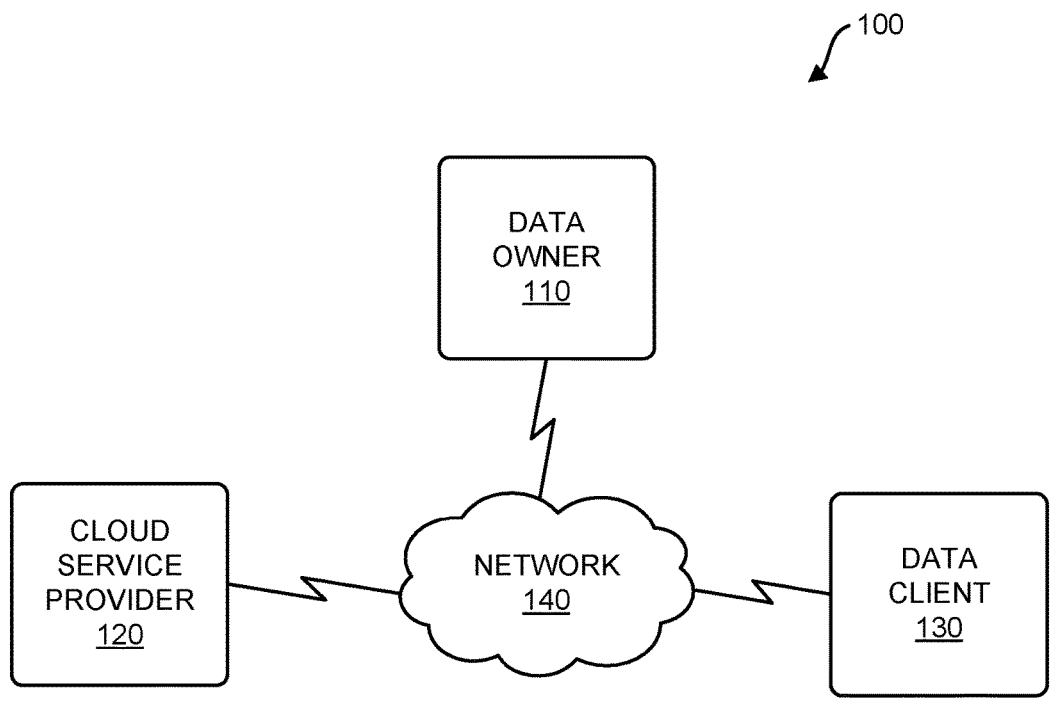
FIG. 1 depicts a block diagram illustrating a network environment consistent with implementations of the current subject matter.

A data owner can apply an order-preserving encryption (OPE) scheme to encrypt data such that only the ciphertext of the data is outsourced to an untrusted cloud service provider. Applying an OPE scheme may prevent unauthorized access to the data by obscuring the plaintext of the data. Furthermore, the same order-based operations (e.g., range queries, sorting, ranking, and/or the like) that can be performed on the plaintext of the data can also be performed on the ciphertext of the data because the ciphertext of the data maintains the same order as the plaintext of the data. For instance, each ciphertext may be associated with an OPE encoding that reflects the relative ordering of the ciphertexts. Nevertheless, typical OPE schemes rely on a single symmetric key. Here, the same symmetric key that is used to generate the ciphertext of the data must also be used to generate the ciphertext for the parameters of the order-based operations on the data. For example, a range query on the ciphertexts stored at the cloud service provider may specify the ciphertexts corresponding to the upper boundary and lower boundary of a range. As such, a third-party (henceforth "data client") is generally unable to execute private order-based operations on OPE encrypted data without compromising either the data client's or the data owner's private information. For instance, for a data client to execute an order-based operation on the ciphertext of the data stored at the cloud service provider, the data owner may be required to reveal the data owner's symmetric key (e.g., to the data client) such that the data client is able to generate the ciphertext for the parameters of the data client's order-based operation. Alternately and/or additionally, the data client may be required to reveal the parameters of its order-based operation (e.g., to the data owner) such that the data owner can provide the corresponding ciphertext.

In some implementations of the current subject matter, a data owner, a data client, and a cloud service provider can be configured to execute an oblivious order-preserving encryption (OOPE) protocol in order for the data client to determine the OPE encoding for a particular input value, which the data client may subsequently use as a parameter (e.g., upper boundary or lower boundary) in one or more order-based operations (e.g., range query) on the data owner's data at the cloud service provider. As previously noted, the data owner may outsource data (e.g., for storage, management, and/or processing) to the cloud service provider. The data owner can encrypt its data prior to outsourcing the data to the cloud service provider such that only the ciphertext of the data is outsourced to the cloud service provider. According to some implementations of the current subject matter, the data owner can apply an OPE scheme to encrypt its data such that the same order that is present in the plaintext of the data is also present in the corresponding ciphertext of the data. Moreover, the OPE scheme may include a homomorphic encryption scheme (e.g., Paillier encryption) that preserves the ability for one or more arithmetic operations to be performed on the ciphertext of the data. For example, the product of multiplying two or more ciphertexts may be a ciphertext of the sum of the two or more ciphertexts. The cloud service provider can store an OPE tree that reflects the relative ordering of the ciphertexts. Furthermore, the cloud service provider can determine the OPE encoding for each ciphertext based on the position of each ciphertext in the OPE tree.

In some implementations of the current subject matter, applying an OOPE protocol enables the data client to execute a private order-based operation on the data owner's data at the cloud service provider without having to reveal the parameters of the private order-based operation (e.g., to the data owner) or learning about the data owner's OPE encryption scheme. For instance, the OOPE protocol can be executed to determine the OPE encoding of the parameters of the data client's private order-based operation. The OPE encodings of these parameters are consistent with the OPE encodings associated with the data owner's data at the cloud service provider. Thus, the data client is able to execute a private order-based operation (e.g., range query) that specifies the OPE encodings as the parameters (e.g., lower boundary and/or upper boundary) of the order-based operation.

In some implementations of the current subject matter, applying an OOPE protocol can include traversing an OPE tree stored at the cloud service provider. The OPE tree can organize the ciphertexts of the data owner's data in a manner that reflects the order that is present in the plaintext of the data. For instance, the OPE tree may be a binary tree in which the corresponding plaintext of the ciphertext at every node in the left subtree of a node in the binary tree are strictly smaller (or greater) than the corresponding plaintext of the ciphertext at every nodes in the right subtree of that node. According to some implementations of the current subject matter, the cloud service provider can be configured to traverse an OPE tree based on the results of one or more oblivious comparisons performed by the data owner and the data client. For example, for each node in the OPE tree that is traversed during the OOPE protocol, the data owner and the data client may perform an oblivious comparison of the plaintext corresponding to the ciphertext at these nodes and the input value from the data client. The result of an oblivious comparison at a particular node in the OPE tree can indicate that traversal of the OPE tree can stop at this node and/or whether the traversal of the OPE tree should continue with the left subtree or the right subtree of the node. For instance, when the result of the oblivious comparison indicates that the input value from the data client and the plaintext value corresponding to the ciphertext at an existing node are equal, the OPE encoding for the input value from the data client may be the same as the OPE encoding associated with that node. Alternately and/or additionally, the entire OPE tree may be traversed without identifying an existing node that is associated with a plaintext value that is equal to the input value from the data client. In this scenario, the input value from the data client may be inserted, as a new node, into the OPE tree (e.g., between two existing nodes) and the OPE encoding for the data clients input value may be the OPE encoding for the new node.

In some implementations of the current subject matter, to enable an oblivious comparison of an input value from the data client and a plaintext corresponding to a ciphertext from the OPE tree, the cloud service provider can provide, to the data owner and to the data client, at least a portion of the respective inputs for the data owner and the data client to input into a garbled circuit configured to perform the oblivious comparison. For example, because a homomorphic encryption scheme (e.g., Paillier encryption) was applied to generate the ciphertexts in the OPE tree, the cloud service provider may be able to randomize the ciphertext at a node of the OPE tree (e.g., by adding a random value to the ciphertext) and provide the randomized ciphertext to the data owner. Randomizing the ciphertext from the OPE tree in this manner can prevent the data owner from identifying the ciphertext that is being compared with the input value from the data client and thereby infer the input value from the data client. Meanwhile, the input value from the data client can also be randomized in the same or similar manner (e.g., by adding the same random value to the data client's input value). According to some implementations of the current subject matter, the data owner and the data client can use a garbled circuit to perform an oblivious comparison of the randomized inputs provided by the cloud service provider. The garbled circuit can be configured to provide an output indicating whether, for example, the input value from the data client is equal to or greater (or less) than a ciphertext from the OPE tree. As noted above, the cloud service provider can traverse the OPE tree based on the result of the oblivious comparison (e.g., the output from the garbled circuit) at one or more nodes of the OPE tree.

In some implementations of the current subject matter, the data owner can apply a deterministic OPE scheme to encrypt the data outsourced to the cloud service provider. A deterministic OPE scheme may generate a single ciphertext for each plaintext value in the data of the data owner. When the data owner applies a deterministic OPE scheme, the OOPE protocol can be configured to determine a single OPE encoding for the input value from the data client. It should be appreciated that a deterministic OPE scheme may leak the frequency with which various data values appear in the data of the data owner. By contrast, in some implementations of the current subject matter, the data owner can apply a non-deterministic OPE scheme in which the same plaintext value in the data of the data owner can be associated with multiple ciphertexts. The non-deterministic OPE scheme can operate to hide the frequency with which data values appear in the data of the data owner. In this scenario, the OOPE protocol can be configured to determine a minimum OPE encoding and a maximum OPE encoding for the input value of the data client. Subsequent order-based operations (e.g., range queries) can specify both the minimum OPE encoding and the maximum OPE encoding as one or more parameters (e.g., lower boundary and/or upper boundary) in order to capture every instance of the plaintext value that occurs in the data of the data owner.

FIG. 1 depicts a block diagram illustrating a network environment 100 consistent with implementations of the current subject matter. Referring to FIG. 1, a data owner 110, a cloud service provider 120, and a data client 130 can be communicatively coupled via a wired and/or wireless network 140. As shown in FIG. 1, the network 140 may be a local area network (LAN), a wide area network (WAN), and/or the Internet.

In some implementations of the current subject matter, the data owner 110 can outsource its data for storage, management, and/or processing at the cloud service provider 120. The data that is outsourced to the cloud service provider 120 can be encrypted (e.g., by the data owner 110) using an order preserving and homomorphic encryption scheme. As such, the ciphertext of the data can maintain the same order that is present in the plaintext of the data. For instance, for a finite dataset $D=\{x_1, \ldots, x_n\}$ from the data owner 110, the corresponding ciphertexts for this finite dataset D may be defined as $[\![D]\!]=\{[\![x_1]\!], \ldots, [\![x_n]\!]\}$, wherein $[\![x_1]\!] \leq [\![x_2]\!]$ if and only if $x_1 \leq x_2$. Furthermore, one or more arithmetic operations can be performed on the ciphertext of the data. For example, the product of multiplying two ciphertext $[\![x_1]\!]$ and $[\![x_2]\!]$ may be equal to a ciphertext of the sum of the corresponding plaintext values $[\![x_1+x_2]\!]$.

Figures 2A, 2B, 2C:
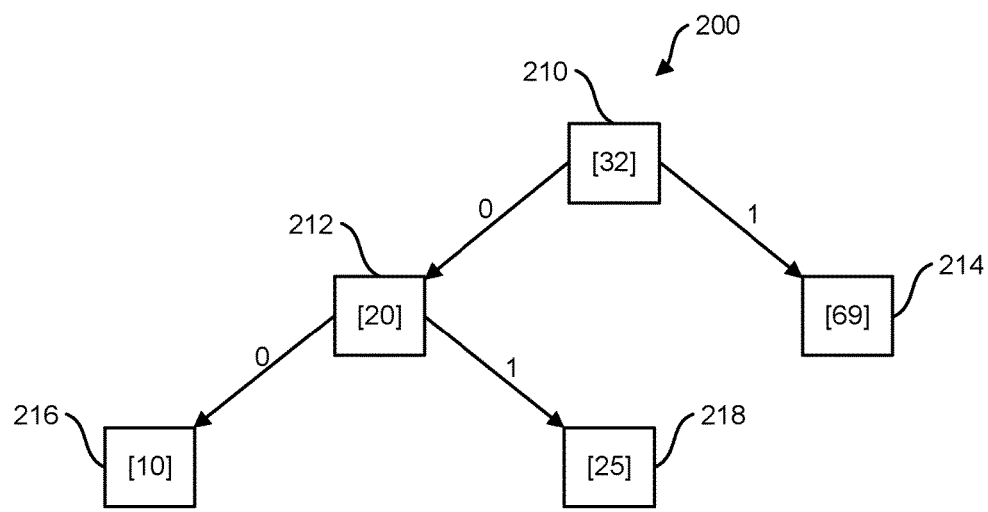
FIG. 2A depicts an order-preserving encryption tree consistent with implementations of the current subject matter.
FIG. 2B depicts an order-preserving encryption table consistent with implementations of the current subject matter.
FIG. 2C depicts a state table consistent with implementations of the current subject matter.

In some implementations of the current subject matter, the cloud service provider 120 can be configured to store the ciphertext of the data from the data owner 110 in a manner that preserves the order that is present in the plaintext of the data. For example, FIG. 2A depicts an OPE tree 200 consistent with implementations of the current subject matter while FIG. 2B depicts an OPE table 250 consistent with implementations of the current subject matter. The cloud service provider 120 can store the ciphertext of the data from the data owner 110 in the OPE tree 200. Meanwhile, the OPE table 250 can store the ciphertexts that are in the OPE tree 200 as well as the corresponding OPE encoding or order of each ciphertext. The OPE encoding of a ciphertext may be generated (e.g., by the cloud service provider 120) based on the position of the node associated with that ciphertext within the OPE tree 200.

Referring to FIG. 2A, the OPE tree 200 can be a binary tree that includes a plurality of nodes including, for example, a first node 210, a second node 212, a third node 214, a fourth node 216, and a fifth node 218. The OPE tree 200 can organize the ciphertext of the data from the data owner 110 in a manner that reflects the order that is present in the plaintext of the data. Thus, the ciphertexts that are in the subtree to the left of a node can all correspond to data that is strictly less than the data corresponding to the ciphertexts in the subtree that are to the right of the node. For instance, as shown in FIG. 2A, the first node 210 may be associated with the ciphertext of the value 32 (e.g., ⟦32⟧). The subtree that is to the left of the first node 210 includes the ciphertext of the values 10, 20, and 25 (e.g., ⟦10⟧, ⟦20⟧, and ⟦25⟧), which are all strictly less than the 32. Meanwhile, the subtree that is to the right of the first node 210 may include the ciphertext of the value 69 (e.g., ⟦69⟧), which is strictly larger than 32.

In some implementations of the current subject matter, the OPE table 250 can store (e.g., in a first column 252) the ciphertexts that are present in the OPE tree 200 as well as the OPE encoding for each of these ciphertext. The OPE encoding of a ciphertext can correspond to position, within the OPE tree 200, of the node that is associated with that ciphertext. For instance, for each data value x in the finite dataset $D=\{x_1, \ldots, x_n\}$ and the corresponding ciphertext ⟦x⟧ from set of ciphertext defined as ⟦D⟧$=\{⟦x_n⟧\}$, the cloud service provider 120 can generate a corresponding OPE encodings y such that $y_i \leq y_j \rightarrow x_i \leq x_j$ for any integers i and j.

According to some implementations of the current subject matter, the cloud service provider 120 can generate the OPE encoding for a ciphertext by at least selecting a minimal OPE encoding and a maximal OPE encoding for the OPE tree 200. The OPE encodings for a plaintext may be determined by at least inserting a new node for the corresponding ciphertext in an appropriate location in the OPE tree 200. For instance, the ciphertext for the plaintext value of 32 (e.g., ⟦32⟧) can be inserted between the minimal OPE encoding 0 and the maximum OPE encoding 28, thereby generating an OPE encoding of 14 for the plaintext value of 32. The ciphertext for the plaintext value of 20 (e.g., ⟦20⟧) can be inserted between the minimal OPE encoding 0 and the OPE encoding 14 for the plaintext value of 32. Doing so may generate, for the plaintext value of 20, an OPE encoding of 7. To determine the OPE encoding for the plaintext value of 25, the corresponding ciphertext (e.g., ⟦25⟧) can be inserted between the OPE encoding 7 (e.g., corresponding to the plaintext value 20) and the OPE encoding 14 (e.g., which corresponds to the plaintext value of 32). As such, the OPE encoding for the plaintext value of 25 can be 10.5, which may be rounded to 11. Similarly, the OPE encoding for the plaintext value of 10 may be 4 while the OPE encoding for the plaintext value of 69 may be 21.

In some implementations of the current subject matter, the cloud service provider 120 can generate the OPE encoding for a ciphertext by padding the OPE encoding such that the OPE encoding for every ciphertext in the OPE tree 200 have a same length (e.g., a same number of bits). For example, the OPE encoding for the ciphertext of the value 25 may include the bit string "01." The cloud service provider 120 can pad this bit string with additional an additional "1" bits to achieve a three-bit bit string (e.g. "011"). By contrast, the OPE encoding for the ciphertext of the value 20 may the bit string "010," which corresponds to the value 2. Here, it should be appreciated that the OPE encoding of for the value 20 is less than the OPE encoding for the value 25.

In some implementations of the current subject matter, the data owner 110 can maintain a state table. FIG. 2C depicts a state table 260 consistent with implementations of the current subject matter. Referring to FIG. 2C, the data owner 110 can maintain the state table 260. The state table 260 can store one or more pairings of plaintext data values and corresponding OPE encodings (e.g., <x, y>). For example, the state table 260 can store the pairing <25, 11> which includes the plaintext value 25 and the corresponding OPE encoding 11. Similarly, the state table 260 can also store the pairing <32, 14> which includes the plaintext value 32 and the corresponding OPE encoding 14.

In some implementations of the current subject matter, the data owner 110, the cloud service provider 120, and the data client 130 can apply an OOPE protocol to enable the data client 130 to determine the OPE encoding $\bar{y}$ of a particular input value $\bar{x}$. The data client 130 can subsequently use the OPE encoding $\bar{y}$ as a parameter in an order-based operation on the encrypted data stored at the cloud service provider 120. For instance, the OPE encoding y may serve as the upper boundary or lower boundary of a range query that can be executed against the ciphertexts stored at the cloud service provider 120. According to some implementations of the current subject matter, to apply the OOPE protocol, the cloud service provider 120 can be configured to traverse the OPE tree 200 based on the results of one or more oblivious comparisons performed by the data owner 110 and the data client 130. For example, cloud service provider 120 can start traversing the OPE tree 200 at the root node (e.g., the first node 210) of the OPE tree 200. At each node in the OPE tree 200 that is traversed by the cloud service provider 120, the data owner 110 and the data client 130 can perform an oblivious comparison of the plaintext x corresponding to the ciphertext ⟦x⟧ at these nodes and the input value $\bar{x}$ from the data client 130. An oblivious comparison is performed to prevent revealing, to the data owner 110, the input value $\bar{x}$ from the data client 130. The cloud service provider 120 can stop and/or continue to traverse the OPE tree 200 based at least on the results of the one or more oblivious comparisons performed by the data owner 110 and the data client 130.

In some implementations of the current subject matter, the result of an oblivious comparison at a particular node of the OPE tree 200 can indicate that the input value $\bar{x}$ from the data client 130 is equal to the plaintext x corresponding to the ciphertext ⟦x⟧. For instance, the result of an oblivious comparison of the input value $\bar{x}$ and the value 20 at the second node 212 can indicate that the input value $\bar{x}$ is equal to the value 20. In this case, the OPE encoding y of the input value $\bar{x}$ is the OPE encoding (e.g., 7) of the value 20 (e.g., ⟦20⟧) that is at that second node 212 of the OPE tree 200. Alternately, the result of the oblivious comparison at that particular node of the OPE tree 200 can indicate that the input value $\bar{x}$ from the data client 130 is greater or less than the plaintext x corresponding to the ciphertext ⟦x⟧. For example, the result of an oblivious comparison of the input value $\bar{x}$ and the value 20 at the second node 212 can indicate that the input value $\bar{x}$ is greater or less than the value 20. In this case, the cloud service provider 120 can continue traversing the OPE tree 200 by performing an oblivious comparison at either the left child node (e.g., the fourth node 216) or the right child node (e.g., the fifth node 218) of the second node 212.

In some implementations of the current subject matter, the cloud service provider 120 can stop traversing the OPE tree 200 when the cloud service provider 120 is able to identify, based one or more oblivious comparisons performed by the data owner 110 and the data client 130, an existing node in the OPE tree 200 that is associated with a plaintext value x that is equal to the input value $\bar{x}$ from the data client 130. Here, the OPE encoding $\bar{y}$ of the input value $\bar{x}$ may be the OPE encoding that existing node in the OPE tree 200. Alternately and/or additionally, the cloud service provider 120 can stop traversing the OPE tree 200 when no existing nodes in the OPE tree 200 is associated with a plaintext value x that is equal to the input value $\bar{x}$ from the data client 130. In this scenario, the cloud service provider 120 can generate the OPE encoding $\bar{y}$ and insert a node with the OPE encoding $\bar{y}$ between two existing nodes in the OPE tree 200. Here, it should be appreciated that the insertion of a new node for the OPE encoding $\bar{y}$ can engender a rebalancing of the OPE tree 200 and a regeneration of the existing OPE encodings. As such, the cloud service provider 120 can further update the OPE table 250 based at least on the OPE encoding $\bar{y}$ and/or a rebalancing of the OPE tree 200. For example, the OPE encoding $\bar{y}$ may be generated based on the following equation (1):

$$\bar{y} \leftarrow y_l + \lceil \frac{y_r - y_l}{2} \rceil \qquad (1)$$

wherein $y_l$ is OPE encoding of the last node traversed by the cloud service provider 120 and the plaintext associated with the ciphertext at that last node is not equal to the input value $\bar{x}$ of the data client 130. Meanwhile, $y_r$ is the OPE encoding of an adjacent node. In some implementations of the current subject matter, $y_r$ may be the OPE encoding of a predecessor or parent node if the input value $\bar{x}$ is not greater than the plaintext associated with $y_l$. Alternately, $y_r$ may be the OPE encoding of a successor or child parent node if the input value $\bar{x}$ is greater than the plaintext associated with $y_l$.

To further illustrate, suppose the input value $\bar{x}$ from the data client 130 is 22. Referring again to FIG. 2A, no existing node in the OPE tree 200 is associated with a plaintext value of 22. As such, the cloud service provider 120 may be required to generate the OPE encoding for 22 based the OPE encodings of two existing nodes in the OPE tree 200. For example, the cloud service provider 120 can determine, based on a previous oblivious comparison performed by the data owner 110 and the data client 130, that 22 is not greater than the plaintext value 25 that is associated with the fifth node 218. Thus, the OPE encoding for 22 may be generated based on the respective OPE encodings of the fifth node 218 and the predecessor or parent node of the fifth node 218 (e.g., the second node 212). As such, the cloud service provider 120 can insert a node for 22 between the second node 212 and the fifth node 218. Moreover, the cloud service provider 120 can update the OPE table 250 to include an entry for the OPE encoding of 22. The insertion of the new node for 22 in the OPE tree 200 and a corresponding entry in the OPE table 250 can enable the execution of one or more subsequent order-based operations (e.g., range queries) from the data client 130 that specify, as one or more parameters (e.g., upper boundary and/or lower boundary), the OPE encoding for 22.

Figure 2D:
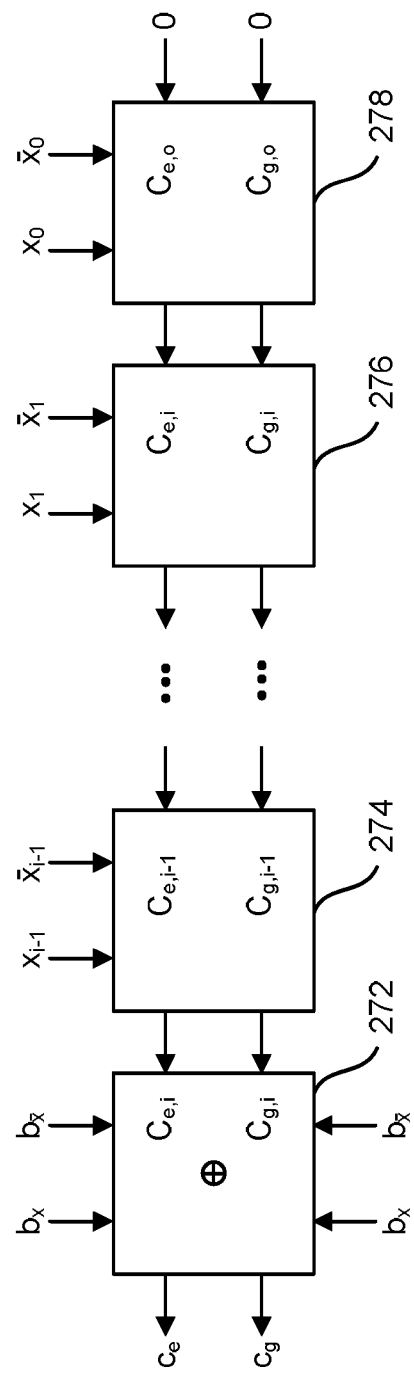
FIG. 2D depicts a garbled circuit consistent with implementations of the current subject matter.

FIG. 2D depicts a garbled circuit 270 consistent with implementations of the current subject matter. In some implementations of the current subject matter, the data owner 110 and the data client 130 can be configured to perform one or more oblivious comparisons using the garbled circuit 270. As shown in FIG. 2D, the garbled circuit 270 can be configured to provide two masked output bits $c_{e,l}$ and $c_{g,l}$. For example, the output bit $c_{e,l}$ can indicate whether the inputs into the garbled circuit 270 are equal while the output bit $c_{g,l}$ can indicate whether the inputs into the garbled circuit 270 are greater (or less) than one another. The cloud service provider 120 can provide, to the data owner 110, a randomized input for the data owner 110 that corresponds to a randomization of the ciphertext ⟦x⟧ from the OPE tree 200. For instance, the cloud service provider 120 can provide, to the data owner 110, a randomized input ⟦x+r⟧ that prevents the data owner 110 from determining the ciphertext ⟦x⟧ that is part of the oblivious comparison and thereby inferring the input value $\bar{x}$ from the data client 130. The data owner 110 can decrypt the randomized input ⟦x+r⟧ to determine the plaintext value x+r. Meanwhile, the cloud service provider 120 can also provide, to the data client 130, a randomized number for the data client 130 to enable the data client 130 to randomize of the input value $\bar{x}$ from the data client 130. For example, the cloud service provider 120 can provide, to the data client 130, a random number r, which the data client 130 can add to the input value $\bar{x}$ to form the randomized input $\bar{x}$+r.

According to some implementations of the current subject matter, the data owner 110 and the data client 130 can further extend the randomized inputs provided by the cloud service provider with one or more additional masking bits. These masking bits can be used to obscure the output bits $c_{e,l}$ and $c_{g,l}$ of the comparison performed by the garbled circuit 270. It should be appreciated that the addition of the masking bits can ensure that only the cloud service provider 120 is able to reveal the result of the comparison (e.g., the output bits $c_{e,l}$ and $c_{g,l}$) performed by the garbled circuit 270. As such, the input of the data owner 110 into the garbled circuit 270 can include the plaintext value x+r and the masking bits $b_o$ and $b'_o$. The input of the data client 130 into the garbled circuit 270 can include the randomized input $\bar{x}$+r and the masking bits $b_a$ and $b'_a$. Suppose that the input x+r of the data owner 110 is a sequence of bits $x_{l-1}, \ldots, x_0$ and that the input $\bar{x}$+r of the data client 130 is another sequence of bits $\bar{x}_{l-1}, \ldots, \bar{x}_o$. Referring to FIG. 2A, the garbled circuit 270 can include a plurality of sub-circuits formed from one or more logic gates (e.g., exclusive-or (XOR) gates, AND gates, OR gates, and/or the like) including, for example, a first sub-circuit 272, a second sub-circuit 274, a third sub-circuit 276, and a fourth sub-circuit 278. The second sub-circuit 274, the third sub-circuit 276, and the fourth sub-circuit 278 may be configured to perform a bit-wise comparison of each of the corresponding bits in the input x+r from the data owner 110 and the input $\bar{x}$+r from the data client 130. The result of the bitwise comparison can be obscured by the first sub-circuit 272, which can be configured to apply the respective masking bits from the data owner 110 and the data client 130. Where the garbled circuit 270 is implemented as a series of XOR gates, the masked output of the garbled circuit 270 can be expressed by the following equation (2):

$$(c_e, c_g) = (c_{e,l} \oplus b_a, \oplus c_{g,l} \oplus b'_a \oplus b'_o) \qquad (2)$$

wherein $\oplus$ refers to the XOR operation, $c_e$ is an unmasked bit indicating whether the inputs into the garbled circuit 270 are equal, and $c_g$ is another unmasked bit indicating whether one input into the garbled circuit 270 is greater than the other input into the garbled circuit 270.

In some implementations of the current subject matter, the data owner 110 can be configured to generate the garbled circuit 270 by generating one or more truth tables enumerating the possible outputs associated with every combination of input values from the data owner 110 and the data client 130. The truth tables are obscured (e.g., encrypted) by the data owner 110 such that the data client 130 cannot determine that plaintext value x+r that is the input of the data owner 110 into the garbled circuit 270. According to some implementations of the current subject matter, the data client 130 can evaluate the garbled circuit 270 based on the input $\bar{x}$+r of the data client 130. The evaluation of the garbled circuit 270 can yield the outputs of the garbled circuit 270. For instance, as noted earlier, where the garbled circuit 270 is implemented as a series of XOR gates, the masked outputs of the garbled circuit 270 can include $(c_e, c_g) = (c_{e,l} \oplus b_a \oplus b_o, c_{g,l} \oplus b'_a \oplus b'_o)$. Here, the data owner 110 can partially unmask the output of the garbled circuit 270 using the masking bits $b_o$ and $b'_o$ of the data owner 110. Similarly, the data client 130 can also partially unmask the output of the garbled circuit 270 using the masking bits $b_a$ and $b'_a$ of the data client 130. The data owner 110 and the data client 130 can both send, to the cloud service provider 120, the partially unmasked outputs from the garbled circuit 270 as well as the respective masking bits used by the data owner 110 and the data client 130. For example, the data owner 110 can send $(b_o, b'_o, c_{e,l} \oplus b_a, c_{g,l} \oplus b'_a)$ while the data client 130 can send $(b_a, b'_a, c_{e,l} \oplus b_o, c_{g,l} \oplus b'_o)$. In order to determine the unmasked output $c_{e,l}$ and $c_{g,l}$ of the garbled circuit 270, the cloud service provider 120 can be configured to evaluate the following equation (3):

$$\begin{cases} c_{e,l} = c_{e,l} \oplus b_o \oplus b_o = c_e \oplus b_a \oplus b_a \\ c_{g,l} = c_{g,l} \oplus b'_o \oplus b'_o = c_g \oplus b'_a \oplus b'_a \end{cases} \quad (3)$$

In some implementations of the current subject matter, the data owner 110 can apply a deterministic OPE scheme to encrypt the data stored to the cloud service provider 120. In this case, the OOPE protocol can be configured to determine a single OPE encoding y for the input value $\bar{x}$ from the data client 130 since each plaintext value x is associated with only a single ciphertext ⟦x⟧ and therefore only a single OPE encoding $\bar{y}$. However, in some implementations of the current subject matter, the data owner 110 can apply a non-deterministic OPE scheme to encrypt the data stored to the cloud service provider 120. Applying a non-deterministic OPE scheme can hide the frequency with which various data values appear in the data of the data owner 110. However, with a non-deterministic OPE scheme, a single plaintext value x can be associated with multiple ciphertexts, ⟦$x_1$⟧, ... ⟦$x_k$⟧. Accordingly, when a non-deterministic OPE scheme is applied to encrypt the data stored to the cloud service provider 120, the OOPE protocol can be configured to generate both a minimum OPE encoding $\bar{y}_{min}$ for the minimum ciphertext ⟦$x_{min}$⟧ and a maximum OPE encoding $\bar{y}_{max}$ for the maximum ciphertext ⟦$x_{max}$⟧.

According to some implementations of the current subject matter, when a non-deterministic OPE scheme is applied, each pairing of ciphertext ⟦x⟧ and OPE encoding $\bar{y}$ is further associated a minimum ciphertext ⟦$x_{min}$⟧ and a maximum ciphertext ⟦$x_{max}$⟧ for the plaintext value x. This associated may be stored by the cloud service provider 120 in the OPE table 250. The OOPE protocol can be applied to first generate an OPE encoding $\bar{y}$ for the input value $\bar{x}$ from the data client 130. Moreover, the cloud service provider 120 can determine, based on the OPE table 250, that the OPE encoding $\bar{y}$ is further associated with a minimum ciphertext ⟦$x_{min}$⟧ and a maximum ciphertext ⟦$x_{max}$⟧. Accordingly, the OOPE protocol can include determining a corresponding a minimum OPE encoding $\bar{y}_{min}$ for the minimum ciphertext ⟦$x_{min}$⟧ and a maximum OPE encoding $\bar{y}_{max}$ for the maximum ciphertext ⟦$x_{max}$⟧.

FIG. 3A depicts pseudo program code 300 consistent with implementations of the current subject matter. Referring to FIGS. 1-3A, the pseudo program code 300 can implement the OOPE protocol that is executed between the data owner 110, the cloud service provider 120, and the data client 130.

In some implementations of the current subject matter, the OOPE protocol can be executed to determine an OPE encoding $\bar{y}$ for the input value $\bar{x}$ from the data client 130. This OPE encoding $\bar{y}$ can subsequently serve as a parameter (e.g., a lower boundary or an upper boundary) in an order-based operation (e.g., range query) from the data client 130.

FIG. 3B depicts pseudo program code 310 consistent with implementations of the current subject matter. Referring to FIGS. 1-3B, the pseudo program code 310 can implement the oblivious comparison that is performed by the data owner 110 and the data client 130. As previously noted, the cloud service provider 120 can traverse, based at least on the results of one or more oblivious comparisons performed by the data owner 110 and the data client 130, an OPE tree (e.g., the OPE tree 200) as part of executing the OOPE protocol (e.g., implemented with the pseudo program code 300 shown in FIG. 3A).

Figure 3C:
FIG. 3C depicts pseudo program code consistent with implementations of the current subject matter.

FIG. 3C depicts pseudo program code 320 consistent with implementations of the current subject matter. Referring to FIGS. 1-3C, the pseudo program code 320 can implement the tree traversal that is performed by the cloud service provider 120. As shown in FIG. 3C, the traversal of an OPE tree can include a selection between a left child node and a right child node that is made based on an oblivious comparison (e.g., implemented with the pseudo program code 310 shown in FIG. 3B) performed by the data owner 110 and the data client 130. The pseudo program code 320 shown in FIG. 3C assumes that the OPE tree is organized with the plaintext data associated with the nodes in the left subtree of the OPE tree being strictly less than the plaintext data associated with the nodes in the right subtree of the OPE tree. Thus, when the oblivious comparison performed by the data owner 110 and the data client 130 indicates that the input value $\bar{x}$ is not greater than the plaintext value x associated with the current node that is being examined during the traversal of the OPE tree, the cloud service provider 120 can be configured to continue traversing the left subtree of the OPE tree. Alternately and/or additionally, when the oblivious comparison performed by the data owner 110 and the data client 130 indicates that the input value $\bar{x}$ is greater than the plaintext value x associated with the current node that is being examined during the traversal of the OPE tree, the cloud service provider 120 can be configured to continue traversing the right subtree of the OPE tree.

FIG. 3D depicts pseudo program code 330 consistent with implementations of the current subject matter. Referring to FIGS. 1-3D, the pseudo program code 330 can implement the determination of an OPE encoding for an input value $\bar{x}$ from the data client 130 that is not equal to the plaintext value associated with any existing node in an OPE tree. For example, referring to FIG. 3A, the traversal of an OPE tree can stop when the cloud service provider 120 reaches a leaf node of the OPE tree (e.g., ⟦$x_{next}$⟧=null) without identifying an existing node that is associated with a plaintext value x that is equal to the input value $\bar{x}$ from the data client 130. Here, the cloud service provider 120 can generate an OPE encoding for the input value $\bar{x}$ and insert a node corresponding to the input value $\bar{x}$ between two existing nodes in the OPE tree. As noted earlier, the OPE encoding $\bar{y}$ for the input value $\bar{x}$ can be computed based on the OPE encodings of these two existing nodes in the OPE tree. For instance, the OPE encoding $\bar{y}$ for the input value $\bar{x}$ can be determined based on the OPE encoding of the current node that is being examined during the traversal of the OPE tree. Furthermore, the OPE encoding $\bar{y}$ for the input value $\bar{x}$ can be further determined based on the OPE encoding of a predecessor or parent node of the current node, when an earlier oblivious comparison of the input value $\bar{x}$ and the plaintext value associated with the current node indicates that the input value $\bar{x}$ is greater. Alternately, the OPE encoding $\bar{y}$ for the input value $\bar{x}$ can be determined based on the OPE encoding of a successor or child node of the current node, when an earlier oblivious comparison of the input value $\bar{x}$ and the plaintext value x associated with the current node indicates that the plaintext value of the current node is greater.

FIG. 3E depicts pseudo program code 340 consistent with implementations of the current subject matter. Referring to FIGS. 1-2 and 3E, the pseudo program code 340 can implement the determination of minimum and maximum OPE encoding when a non-deterministic OPE scheme is used to encrypt the data stored to the cloud service provider 120. The pseudo program code 340 can be executed subsequent to the determination of the OPE encoding $\bar{y}$ for the input value $\bar{x}$ from the data client 130 (e.g., implemented with the pseudo program code 300 shown in FIG. 3A).

Figure 4:
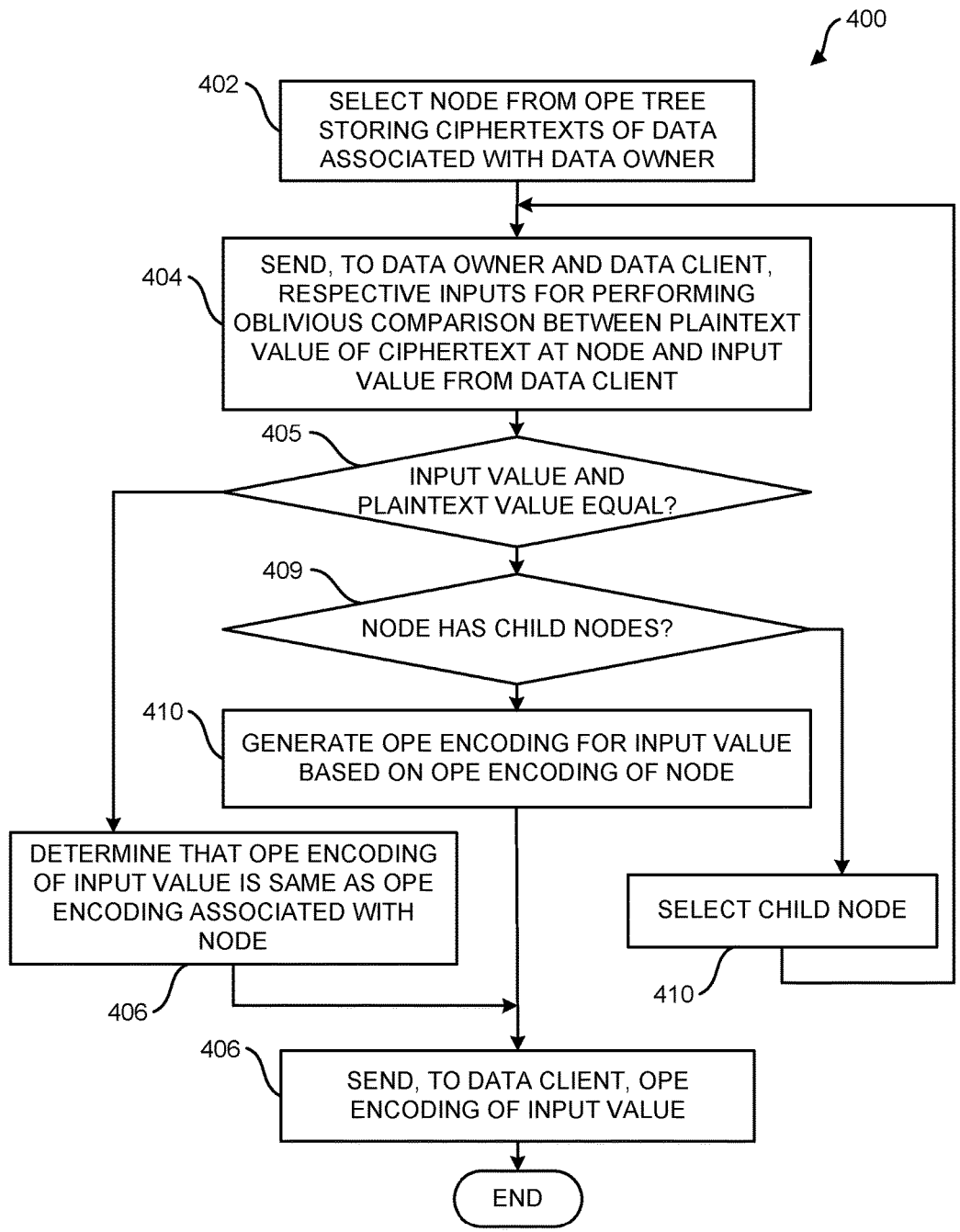
FIG. 4 depicts a flowchart illustrating a process for oblivious order-preserving encryption consistent with implementations of the current subject matter.

FIG. 4 depicts a flowchart illustrating a process 400 for oblivious order-preserving encryption consistent with implementations of the current subject matter. Referring to FIGS. 1-4, in some implementations of the current subject matter, the process 400 can be performed by the cloud service provider 120.

The cloud service provider 120 can select a node from an OPE tree storing a plurality of ciphertexts corresponding to data associated with the data owner 110 (402). For example, the cloud service provider 120 can store the OPE tree 200 and a corresponding OPE table 250. The OPE tree 200 can include a plurality of nodes (e.g., the first node 210, the second node 212, the third node 214, the fourth node 216, and the fifth node 218). The relative positions of the nodes in the OPE tree 200 can reflect an order of the ciphertext at each of the plurality of nodes. Meanwhile, the OPE table 250 can store the OPE encoding that corresponds to each node in the OPE tree 200. The OPE encoding of a node can correspond to the path that is traversed to reach the node from a root node (e.g., the first node 210) of the OPE tree 200. According to some implementations of the current subject matter, the cloud service provider 120 can be configured to traverse the OPE tree 200 starting from the root node (e.g., the first node 210) of the OPE tree.

The cloud service provider 120 can send, to the data owner 110 and the data client 130, at least a portion of the respective inputs for performing an oblivious comparison between a plaintext value of the ciphertext at the node and an input value from the data client 130 (404). For example, the cloud service provider 120 can provide, to the data owner 110, a randomized input for the data owner 110 that corresponds to a randomization of the ciphertext ⟦x⟧ at the node that was selected from the OPE tree 200 (e.g., at operation 402). For instance, the cloud service provider 120 can provide, to the data owner 110, a randomized input ⟦x+r⟧ that prevents the data owner 110 from determining the ciphertext ⟦x⟧ that is part of the oblivious comparison and thereby inferring the input value $\bar{x}$ from the data client 130. The data owner 110 can decrypt the randomized input ⟦x+r⟧ to determine the plaintext value of x+r. Meanwhile, the cloud service provider 120 can also provide, to the data client 130, a randomized input for the data client 130 that corresponds to a randomization of the input value $\bar{x}$ from the data client 130. For example, the cloud service provider 120 can provide, to the data client 130, a randomized input $\bar{x}$+r. The data owner 110 and the data client 130 can further extend the randomized inputs from the cloud service provider 120 (e.g., with one or more masking bits) to generate the input into the garbled circuit 270, which can be configured to perform the oblivious comparison and generate a result that indicates whether the input value $\bar{x}$ from the data client 130 is equal to, greater than, or less than the plaintext value x corresponding to the ciphertext ⟦x⟧.

The cloud service provider 120 can determine, based on the result of the oblivious comparison performed by the data owner 110 and the data client 130, whether the input value from the data client 130 is equal to the plaintext value of the ciphertext at the node (405). The cloud service provider 120 can determine, based on the result of the oblivious comparison, that the input value from the data client 130 is equal to the plaintext value of the ciphertext at the node (405-Y). As such, the cloud service provider 120 can determine that the OPE encoding of the input value from the data client 130 is the same as the OPE encoding associated with the node (406). The cloud service provider 120 can send, to the data client 130, the OPE encoding for the input value from the data client 130 (408) and the process 400 can terminate. For example, when the result of the oblivious comparison indicates that the input value $\bar{x}$ from the data client 130 is equal to the plaintext value x corresponding to the ciphertext ⟦x⟧, the cloud service provider 120 can determine that the OPE encoding y of the input value $\bar{x}$ is the same as the OPE encoding of the node associated with the ciphertext ⟦x⟧. Thus, the cloud service provider 120 may send, to the data client 130, the OPE encoding $\bar{y}$ of the node associated with the ciphertext ⟦x⟧. The data client 130 may use the OPE encoding $\bar{y}$ as a parameter (e.g., upper boundary or lower boundary) when forming one or more subsequent order-based operations (e.g., range queries) on the encrypted data stored at the cloud service provider 120.

Alternately and/or additionally, the cloud service provider 120 can determine, based on the result of the oblivious comparison, that the input value from the data client 130 is not equal to the plaintext value of the ciphertext at the node (405-N). In this scenario, the cloud service provider 120 can determine whether the node has one or more child nodes (409). If the cloud service provider 120 determines that the node has one or more child nodes (409-Y), the cloud service provider 120 can continue to traverse the OPE tree. That is, the cloud service provider 120 can select a child node (410) and the process 400 can continue at operation 404 where the cloud service provider 120 sends, to the data owner 110 and the data client 130, at least a portion of the respective inputs for performing an oblivious comparison of a plaintext value of the ciphertext at the child node and the input value from the data client 130.

For example, the cloud service provider 120 can continue to traverse the OPE tree 200 when the result of the oblivious comparison indicates that the input value $\bar{x}$ from the data client 130 is not equal to the plaintext value x corresponding to the ciphertext ⟦x⟧. When current node that is being traversed has one or more child nodes, the cloud service provider 120 can determine whether to continue traversing the OPE tree 210 via the left child node or the right child node of the current node. In some implementations of the current subject matter, the OPE tree 200 is organized as shown in FIG. 2A with the plaintext data associated with the nodes in the left subtree of the OPE tree 200 being strictly less than the plaintext data associated with the nodes in the right subtree of the OPE tree 200. In this scenario, when the oblivious comparison performed by the data owner 110 and the data client 130 indicates that the input value $\bar{x}$ is not greater than the plaintext value x associated with the current node that is being examined during the traversal of the OPE tree 200, the cloud service provider 120 can be configured to continue traversing the OPE tree 200 by selecting a left child node of the current node. Alternately and/or additionally, when the oblivious comparison performed by the data owner 110 and the data client 130 indicates that the input value $\bar{x}$ is greater than the plaintext value x associated with the current node that is being examined during the traversal of the OPE tree 200, the cloud service provider 120 can be configured to continue traversing the OPE tree 200 by selecting a right child node of the current node.

Alternately and/or additionally, the cloud service provider 120 can determine that the node does not have any child nodes (409-N). As such, the cloud service provider 120 can generate an OPE encoding for the input value from the data client 130 based at least on the OPE encoding associated with the node (412). The cloud service provider 120 can send, to the data client 130, the OPE encoding for the input value from the data client 130 (408) and the process 400 can terminate.

For example, the traversal of the OPE tree 200 can stop when the cloud service provider 120 reaches a leaf node of the OPE tree (e.g., ⟦$x_{next}$⟧=null) without identifying an existing node that is associated with a plaintext value x that is equal to the input value $\bar{x}$ from the data client 130. Here, the cloud service provider 120 can generate an OPE encoding for the input value $\bar{x}$ and insert a node corresponding to the input value $\bar{x}$ between two existing nodes in the OPE tree. As noted earlier, the OPE encoding $\bar{y}$ for the input value $\bar{x}$ can be computed based on the OPE encodings of these two existing nodes in the OPE tree. For instance, the OPE encoding $\bar{y}$ for the input value $\bar{x}$ can be determined based on the OPE encoding of the current node that is being examined during the traversal of the OPE tree. Furthermore, the OPE encoding $\bar{y}$ for the input value $\bar{x}$ can be further determined based on the OPE encoding of a predecessor or parent node of the current node, when an earlier oblivious comparison of the input value $\bar{x}$ and the plaintext value x associated with the current node indicates that the input value $\bar{x}$ is greater. Alternately, the OPE encoding y for the input value $\bar{x}$ can be determined based on the OPE encoding of a successor or child node of the current node, when an earlier oblivious comparison of the input value $\bar{x}$ and the plaintext value x associated with the current node indicates that the plaintext value of the current node is greater. The OPE encoding y for the input value $\bar{x}$ can be sent to the data client 130 to enable the data client 130 to form one or more subsequent order-based operations (e.g., range queries) that includes, as a parameter (e.g., upper boundary or lower boundary), OPE encoding $\bar{y}$.

Figure 5:
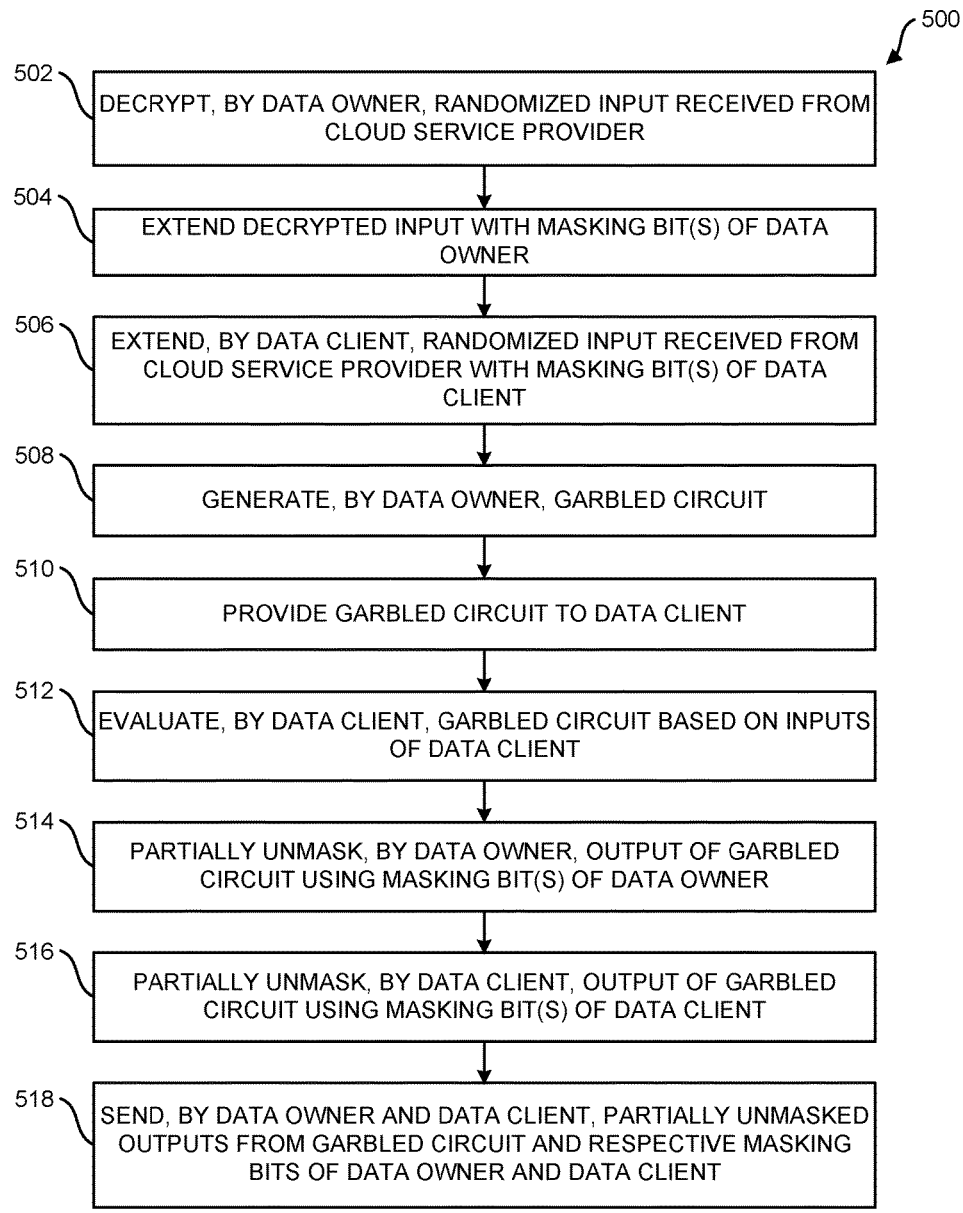
FIG. 5 depicts a flowchart illustrating a process for oblivious comparison consistent with implementations of the current subject matter.

FIG. 5 depicts a flowchart illustrating a process 500 for oblivious comparison consistent with implementations of the current subject matter. Referring to FIGS. 1-5, in some implementations of the current subject matter, the process 400 can be performed by the data owner 110 and the data client 130.

The data owner 110 can decrypt randomized input received from the cloud service provider 120 (502) and extend the decrypted input with one or more masking bits associated with the data owner 110 (504). For example, the cloud service provider 120 can provide, to the data owner 110, a randomized input ⟦x+r⟧ that prevents the data owner 110 from determining the ciphertext ⟦x⟧ that is part of the oblivious comparison and thereby inferring the input value $\bar{x}$ from the data client 130. The data owner 110 can decrypt the randomized input ⟦x+r⟧ to determine the plaintext value x+r. The data owner 110 can further extend the plaintext value x+r with masking bits $b_o$ and $b'_o$.

The data client 130 can extend the randomized input received from cloud service provider 120 with one or more masking bits associated with the data owner 120 (506). For example, the cloud service provider 120 can provide, to the data client 130, a randomized input $\bar{x}$+r. The data client 130 can also extend the randomized input $\bar{x}$+r with the masking bits $b_a$ and $b'_a$.

The data owner 110 can generate the garbled circuit 270 (508) and provide the garbled circuit 270 to the data client 130 (510). As such, the data client 130 is able to evaluate the garbled circuit 270 based at least on the inputs of the data client 130, which includes the randomized input from the cloud service provider 120 and the masking bits associated with the data client 130 (512). For example, the data owner 110 can generate the garbled circuit 270 by generating one or more truth tables enumerating the possible outputs associated with every combination of input values from the data owner 110 and the data client 130. The truth tables are obscured (e.g., encrypted) by the data owner 110 such that the data client 130 cannot determine that plaintext value x+r that is the input of the data owner 110 into the garbled circuit 270. According to some implementations of the current subject matter, the data client 130 can evaluate the garbled circuit 270 based on the input $\bar{x}$+r of the data client 130. The evaluation of the garbled circuit 270 can yield the outputs of the garbled circuit 270. For instance, as noted earlier, where the garbled circuit 270 is implemented as a series of XOR gates, the masked outputs of the garbled circuit 270 can include $(c_e, c_g)=(c_{e,i} \oplus b_a \oplus b_o, c_{g,i} \oplus b'_a \oplus b'_o)$.

The data owner 110 can partially unmask, based at least on the one or more masking bits associated with the data owner 110, the masked output generated by the garbled circuit 270 (514). Similarly, the data client 130 can also partially unmask, based at least on the one or more masking bits associated with data client 130, the masked output generated by the garbled circuit 270 (516). The data owner 110 and the data client 130 can send, to the cloud service provider 120, the partially unmasked outputs of the garbled circuit 270 along with respective masking bits of the data client 110 and the data client 130 (518). For example, the data owner 110 can partially unmask the output of the garbled circuit 270 using the masking bits $b_o$ and $b'_o$ of the data owner 110. Similarly, the data client 130 can also partially unmask the output of the garbled circuit 270 using the masking bits $b_a$ and $b'_a$ of the data client 130. The data owner 110 and the data client 130 can both send, to the cloud service provider 120, the partially unmasked outputs from the garbled circuit 270 as well as the respective masking bits used by the data owner 110 and the data client 130. Accordingly, the data owner 110 can send $(b_o, b'_o, c_{e,i} \oplus b_a, c_{g,i} \oplus b'_a)$ while the data client 130 can send $(b_a, b'_a, c_{e,i} \oplus b_o, c_{g,i} \oplus b'_o)$.

Figure 6:
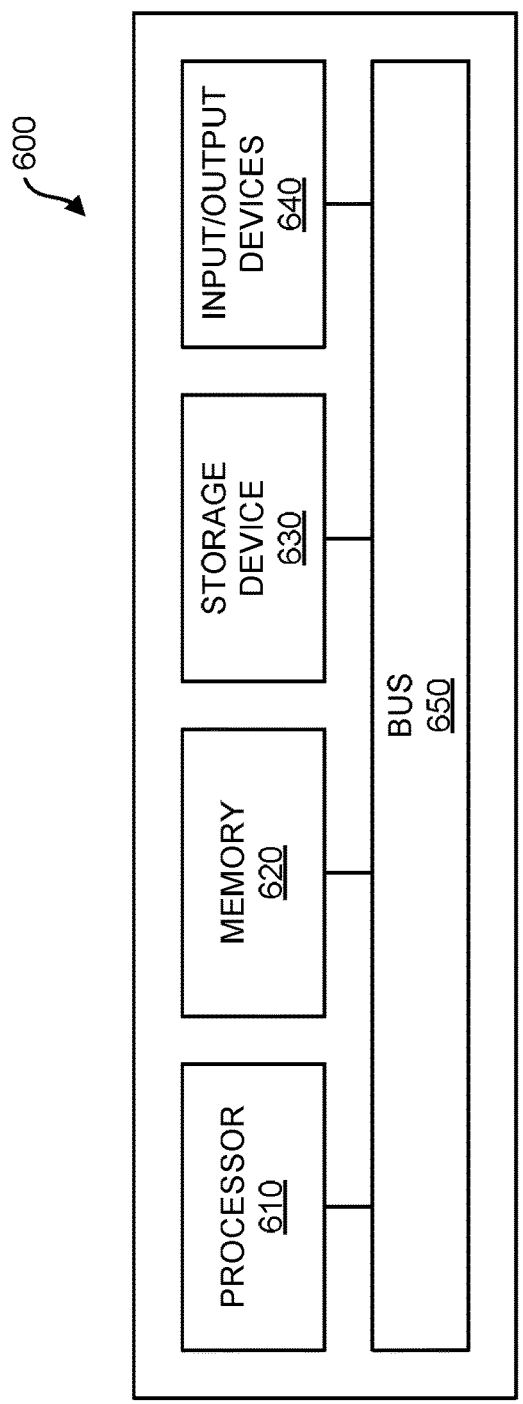
FIG. 6 depicts a block diagram illustrating a computing system consistent with implementations of the current subject matter.

FIG. 6 depicts a block diagram illustrating a computing system 600 consistent with some implementations of the current subject matter. Referring to FIGS. 1-7, the computing system 600 can be used to implement the data owner 110, the cloud service provider 120, and/or the data client 130.

As shown in FIG. 6, the computing system 600 can include a processor 610, a memory 620, a storage device 630, and input/output devices 640. The processor 610, the memory 620, the storage device 630, and the input/output devices 640 can be interconnected via a system bus 650. The processor 610 is capable of processing instructions for execution within the computing system 600. Such executed instructions can implement one or more components of, for example, the data owner 110, the cloud service provider 120, and/or the data client 130. In some example embodiments, the processor 610 can be a single-threaded processor. Alternately, the processor 610 can be a multi-threaded processor. The processor 610 is capable of processing instructions stored in the memory 620 and/or on the storage device 630 to display graphical information for a user interface provided via the input/output device 640.

The memory 620 is a computer readable medium such as volatile or non-volatile that stores information within the computing system 600. The memory 620 can store data structures representing configuration object databases, for example. The storage device 630 is capable of providing persistent storage for the computing system 600. The storage device 630 can be a floppy disk device, a hard disk device, an optical disk device, or a tape device, or other suitable persistent storage means. The input/output device 640 provides input/output operations for the computing system 600. In some example embodiments, the input/output device 640 includes a keyboard and/or pointing device. In various implementations, the input/output device 640 includes a display unit for displaying graphical user interfaces.

According to some implementations of the current subject matter, the input/output device 640 can provide input/output operations for a network device. For example, the input/output device 640 can include Ethernet ports or other networking ports to communicate with one or more wired and/or wireless networks (e.g., a local area network (LAN), a wide area network (WAN), the Internet).

In some example embodiments, the computing system 600 can be used to execute various interactive computer software applications that can be used for organization, analysis and/or storage of data in various (e.g., tabular) format (e.g., Microsoft Excel®, and/or any other type of software). Alternatively, the computing system 600 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be standalone computing products and/or functionalities. Upon activation within the applications, the functionalities can be used to generate the user interface provided via the input/output device 640. The user interface can be generated and presented to a user by the computing system 600 (e.g., on a computer screen monitor, etc.).

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on,"

above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method, comprising:
receiving by at a cloud service provider, an input value from a data client, the cloud service provider storing, in an order preserving encryption (OPE) tree, a plurality of ciphertexts corresponding to encrypted data associated with the OPE tree having a plurality of nodes that each corresponds to one of the plurality of ciphertexts, and a relative position of the plurality of nodes within the OPE tree corresponding to an order that is present in the encrypted data associated with the data owner;
in response to receiving the input value from the data client, generating, by the cloud service provider, a first randomized input and a second randomized input, the first randomized input being generated based at least on a ciphertext at a first node of the OPE tree, and the second randomized input being generated based at least on the input value received from the data client;
sending, to the data owner and the data client, the first randomized input and the second randomized input to at least enable the data owner and the data client to perform an oblivious comparison to determine the input value as being less than, equal to, or greater than a plaintext value of the ciphertext at the first node of the OPE tree, the oblivious comparison being performed without revealing, to the data owner, the input value received from the data client;
traversing, based at least on a result of the oblivious comparison, the OPE tree;
determining, based at least on the traversal of the OPE tree, an OPE encoding for the input value received from the data client, the OPE encoding for the input value indicative of a position of a node corresponding to the input value within the OPE tree; and
performing, based at least on the OPE encoding of the input value received from the data client, an order-based operation on the encrypted data stored at the cloud service provider.

2. The computer-implemented method of claim 1, further comprising:
traversing from the first node of the OPE tree to a second node of the OPE tree based at least on the result of the oblivious comparison indicating that the input value is less than or greater than the plaintext value of the ciphertext at the first node of the OPE tree.

3. The computer-implemented method of claim 1, further comprising:
determining that the OPE encoding for the input value received from the data client corresponds to an OPE encoding associated with the first node of the OPE tree based at least on the result of the oblivious comparison indicating the input value being equal to the plaintext value of the ciphertext at the first node selected of the OPE tree.

4. The computer-implemented method of claim 1, further comprising:
determining whether the first node has one or more child nodes in response to the result of the oblivious comparison indicating that the input value from the data client is not equal to the plaintext value of the ciphertext at the first node of the OPE tree.

5. The computer-implemented method of claim 4, further comprising:
generating, based at least on the OPE encoding associated with the first node of the OPE tree, the OPE encoding for the input value in response to determining that that the first node does not have one or more child nodes.

6. The computer-implemented method of claim 5, wherein the OPE encoding for the input value is further determined based on an OPE encoding of a successor node or a predecessor node of the first node.

7. The computer-implemented method of claim 2, wherein the performing of the oblivious comparison comprises:
generating, by the data owner, a garbled circuit configured to perform the oblivious comparison; and
evaluating, by the data client, the garbled circuit, the evaluating of the garbled circuit being based at least on the randomized input corresponding to the input value from the data client.

8. The computer-implemented method of claim 7, wherein the garbled circuit is configured to mask the result of the oblivious comparison using one or more masking bits associated with the data owner and/or the data client.

9. The computer-implemented method of claim 8, wherein the performing of the oblivious comparison further comprises:
partially unmasking, by the data owner, the result of the oblivious comparison using one or more masking bits associated with the data owner; and
partially unmasking, by the data client, the result of the oblivious comparison using one or more masking bits associated with the data client.

10. The computer-implemented method of claim 9, further comprising:
receiving, at the cloud service provider, a partially unmasked result of the oblivious comparison from each of the data owner and the data client and a respective masking bits used by each of the data owner and the data client.

11. A system, comprising:
at least one processor; and
at least one memory storing instructions which, when executed by the at least one processor, result in operations comprising:
receiving, at a cloud service provider, an input value from a data client, the cloud service provider storing, in an order preserving encryption (OPE) tree, a plurality of ciphertexts corresponding to encrypted data associated a data owner, the OPE tree having a plurality of nodes that each corresponds to one of the plurality of ciphertexts, and a relative position of the plurality of nodes within the OPE tree corresponding to an order that is present in the encrypted data associated with the data owner;

in response to receiving the input value from the data client, generating, by the cloud service provider, a first randomized input and a second randomized input, the first randomized input being generated based at least on a ciphertext at a first node of the OPE tree, and the second randomized input being generated based at least on the input value received from the data client;

sending, to the data owner and the data client, the first randomized input and the second randomized input to at least enable the data owner and the data client to perform an oblivious comparison to determine the input value as being less than, equal to, or greater than a plaintext value of the ciphertext at the first node of the OPE tree, the oblivious comparison being performed without revealing, to the data owner, the input value received from the data client;

traversing, based at least on a result of the oblivious comparison, the OPE tree;

determining, based at least on the traversal of the OPE tree, an OPE encoding for the input value received from the data client, the OPE encoding for the input value indicative of a position of a node corresponding to the input value within the OPE tree; and performing, based at least on the OPE encoding of the input value received from the data client, an order-based operation on the encrypted data stored at the cloud service provider.

12. The system of claim 11, further comprising:
traversing from the first node of the OPE tree to a second node of the OPE tree based at least on the result of the oblivious comparison indicating that the input value is less than or greater than the plaintext value of the ciphertext at the first node of the OPE tree.

13. The system of claim 11, further comprising:
determining that the OPE encoding for the input value received from the data client corresponds to an OPE encoding associated with the first node of the OPE tree based at least on the result of the oblivious comparison indicating the input value being equal to the plaintext value of the ciphertext at the first node selected of the OPE tree.

14. The system of claim 11, further comprising:
determining whether the first node has one or more child nodes in response to the result of the oblivious comparison indicating that the input value from the data client is not equal to the plaintext value of the ciphertext at the first node of the OPE tree.

15. The system of claim 14, further comprising:
generating, based at least on the OPE encoding associated with the first node of the OPE tree, the OPE encoding for the input value in response to determining that that the first node does not have one or more child nodes.

16. The system of claim 15, wherein the OPE encoding for the input value is further determined based on an OPE encoding of a successor node or a predecessor node of the first node.

17. The system of claim 12, wherein the data owner is configured to perform the oblivious comparison by at least generating a garbled circuit configured to perform the oblivious comparison, and wherein the data client is configured to perform the oblivious comparison by at least evaluating the garbled circuit, the evaluating of the garbled circuit being based at least on the randomized input corresponding to the input value from the data client.

18. The system of claim 17, wherein the garbled circuit is configured to mask the result of the oblivious comparison using one or more masking bits associated with the data owner and/or the data client.

19. The system of claim 18, wherein the data owner is further configured to perform the oblivious comparison by at least partially unmasking the result of the oblivious comparison using one or more masking bits associated with the data owner, wherein the data client is further configured to perform the oblivious comparison by at least partially unmasking the result of the oblivious comparison using one or more masking bits associated with the data client, and wherein the cloud service provider is configured to receive a partially unmasked result of the oblivious comparison from each of the data owner and the data client and a respective masking bits used by each of the data owner and the data client.

20. A non-transitory computer-readable storage medium including program code, which when executed by at least one data processor, cause operations comprising:

receiving, at a cloud service provider, an input value from a data client, the cloud service provider storing, in an order preserving encryption (OPE) tree, a plurality of ciphertexts corresponding to encrypted data associated with a data owner, the OPE tree having a plurality of nodes that each corresponds to one of the plurality of ciphertexts, and a relative position of the plurality of nodes within the OPE tree corresponding to an order that is present in the encrypted data associated with the data owner;

in response to receiving the input value from the data client, generating, by the cloud service provider, a first randomized input and a second randomized input, the first randomized input being generated based at least on a ciphertext at a first node of the OPE tree, and the second randomized input being generated based at least on the input value received from the data client;

sending, to the data owner and the data client, the first randomized input and the second randomized input to at least enable the data owner and the data client to perform an oblivious comparison to determine the input value as being less than, equal to, or greater than a plaintext value of the ciphertext at the first node of the OPE tree, the oblivious comparison being performed without revealing, to the data owner, the input value received from the data client;

traversing, based at least on a result of the oblivious comparison, the OPE tree;

determining, based at least on the traversal of the OPE tree, an OPE encoding for the input value received from the data client, the OPE encoding for the input value indicative of a position of a node corresponding to the input value within the OPE tree; and performing, based at least on the OPE encoding of the input value received from the data client, an order-based operation on the encrypted data stored at the cloud service provider.

* * * * *